United States Patent
Eacock

[15] 3,648,584
[45] Mar. 14, 1972

[54] PHOTOGRAPHIC FILM HANDLING AND PROCESSING SYSTEM

[72] Inventor: Michael F. Eacock, Lexington, Mass.
[73] Assignee: Polaroid Corporation, Cambridge, Mass.
[22] Filed: Jan. 2, 1970
[21] Appl. No.: 7

[52] U.S. Cl. .............................................. 95/13, 95/89 L
[51] Int. Cl. ........................................................ G03b 17/50
[58] Field of Search ................. 156/524, 547, 549, 550, 551, 156/575; 95/13, 89 R, 89 L

[56] References Cited

UNITED STATES PATENTS

| 2,543,180 | 2/1951 | Land | 95/13 |
| 2,949,206 | 8/1960 | Figge | 156/575 X |

*Primary Examiner*—Joseph F. Peters, Jr.
*Assistant Examiner*—Richard L. Moses
*Attorney*—Brown and Mikulka, William D. Roberson and Robert L. Berger

[57] ABSTRACT

A carriage is mounted for reversible displacement across an exposure station of a camera and mounts in sequence an applicator, a guide bar and a resiliently compressible roller. A supply of photosensitive material is initially mounted adjacent one end of the exposure station while a supply of image-receiving material is mounted on the carriage. In its initial pass across the exposure station, the carriage draws a first section of photosensitive material onto the exposure station. After exposure and as the carriage is returned across the exposure station towards the supply of photosensitive material, a processing liquid is expressed from the applicator onto the section of exposed photosensitive sheet while a section of image-receiving material is simultaneously, progressively played out around the guide bar over the wetted photosensitive sheet and firmly pressed thereagainst by the resilient roller. In its next pass across the exposure station, the carriage advances the superposed sheets from the exposure station and draws a new section of photosensitive material thereonto. As the superposed sheets leave the exposure station, they are separated and the first section of image-receiving material ejected from the camera while the processed photosensitive sheet is stored within the camera. Other features include an edge control arrangement on the carriage and a unique application configuration.

32 Claims, 9 Drawing Figures

Patented March 14, 1972

INVENTOR.
MICHAEL F. EACOCK

BY Brown and Mikulka
and
Robert L. Berger
ATTORNEYS

Patented March 14, 1972

INVENTOR.
MICHAEL F. EACOCK

BY Brown and Mikulka
and
Robert L. Berger
ATTORNEYS

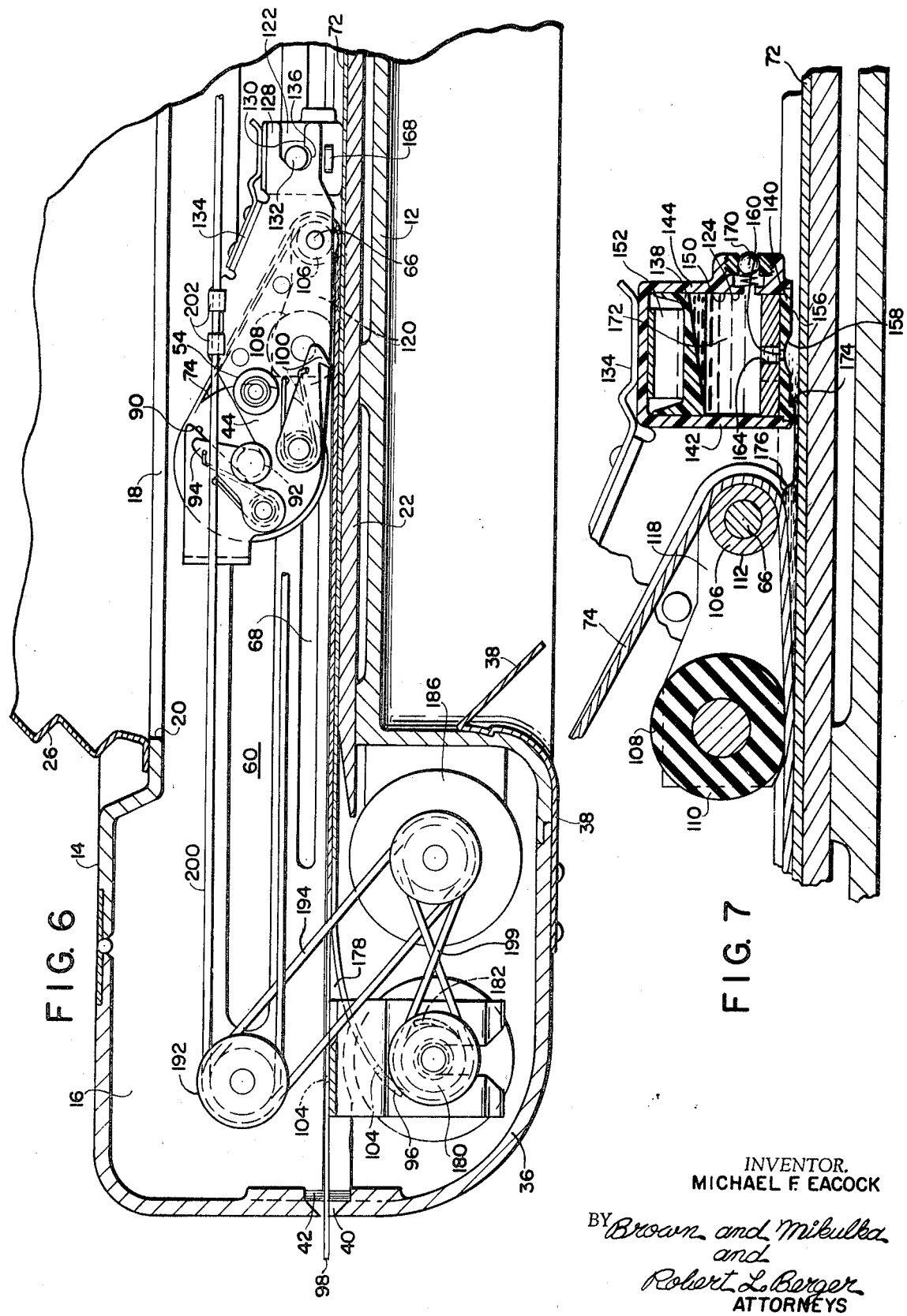

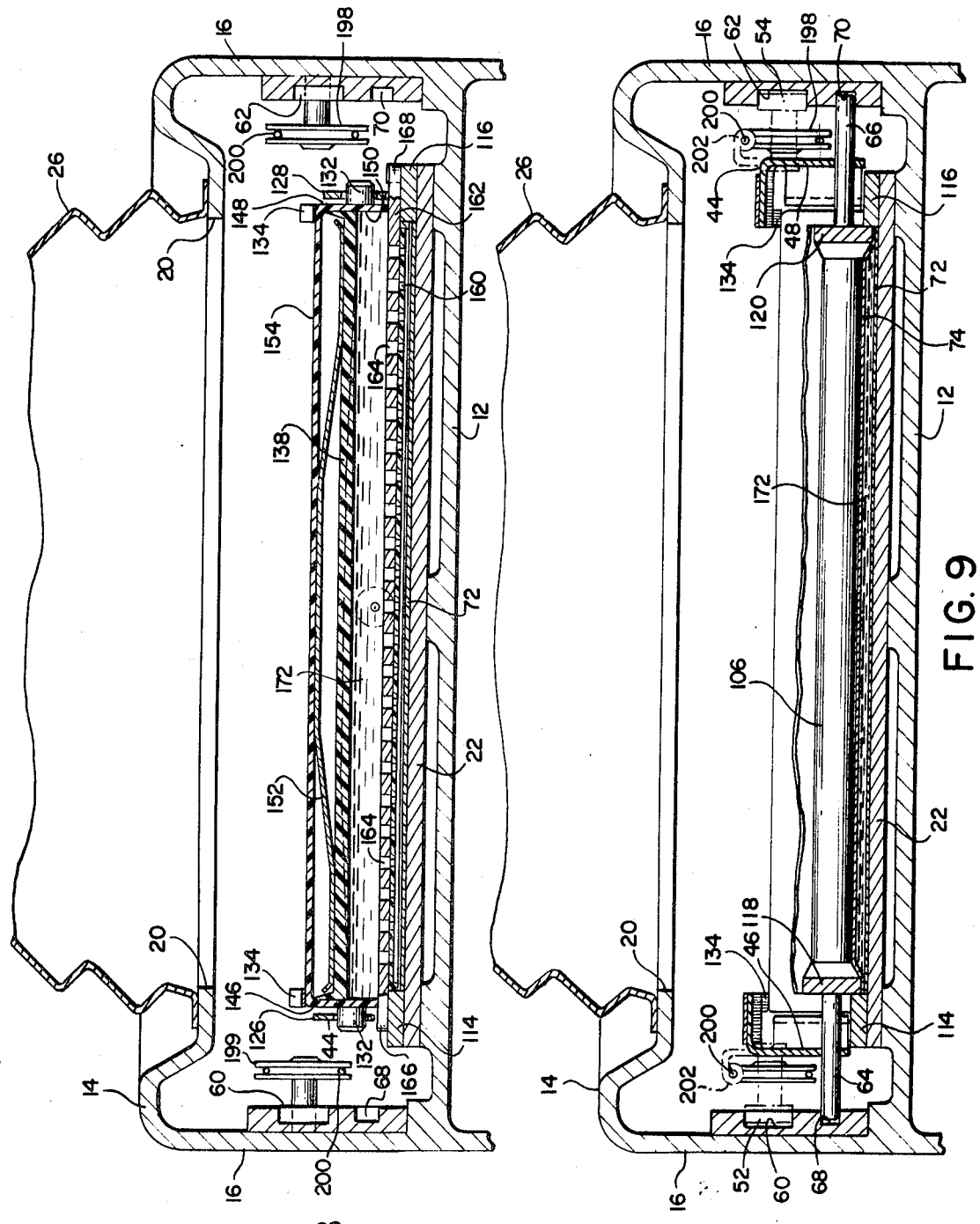

PHOTOGRAPHIC FILM HANDLING AND PROCESSING SYSTEM

BACKGROUND OF THE INVENTION

1. Field of Invention

This invention relates to photography and, more particularly, to a camera of the self-developing type having an improved film handling and processing system.

2. Description of the Prior Art

In diffusion-transfer photography it has generally been the practice to employ film elements comprising a photosensitive image-recording sheet and an image-receiving photographic sheet incorporating various additional components, e.g., pods, leaders, rails, masks, bibs and traps, for controlling the spread of processing fluid therebetween. These auxiliary components represent significant elements of cost in the production of finished prints by the diffusion-transfer process. Additionally, after each photographic print of the diffusion-transfer type has been made, the photographer has traditionally been required to handle and dispose of considerable waste material. Such waste material not only includes the above mentioned auxiliary film components, but also the processed negative emulsion bearing photographic sheet. This task has proved to be somewhat of an inconvenience to the operator and one which, in some instances, can be quite messy considering the fact that certain of these materials are wetted with processing chemicals.

Also in systems of this type, certain obvious advantages are realized when the image-transfer process is performed while the film unit is retained within the camera. Normally, cameras heretofore devised to realize the advantages of such processing procedures include an arrangement whereby the exposed negative sheet is withdrawn from the exposure station into a separate compartment of the camera adapted to serve as an inhibition chamber. Naturally, the requirement for such a separate compartment increases both the size and weight of the camera.

Processing fluids employed to treat the exposed photosensitive emulsion in heretofore marketed cameras of the self-developing type have generally been of a relatively high viscous constituency. While highly satisfactory results have been attained with such viscous fluids, their use has presented problems relating to the provision of the fluid between the sheets. Additionally, the precision viscous fluid spreading members themselves can represent a substantial portion of the cost of the camera system. Such spreading members also contribute greatly to the weight of the camera, particularly where the camera is of the large format type. These considerations, coupled with the recognition that certain photographic processes can be performed more rapidly with improved results if the image-recording material is treated with a processing liquid having a viscosity more akin to that of water, have in part lead to the development of the present invention. Other advantages of "liquid" systems are that they are less resistive to drying of the developer on the working surfaces and the surface of the processed print dries quickly.

The problem of providing a uniform spread of processing fluid becomes increasingly more complex as the size of the picture format is enlarged. More time is required to effect the spreading of the fluid onto the negative emulsion, which situation, if not properly controlled or compensated for, can result in overdeveloped and/or fluid starved areas of the exposed negative material. Also, along these same lines, disproportionately greater amounts of photographic sheet materials extending beyond the borders of the print format, as well as disproportionately greater quantities of processing fluid, may be required to accommodate a substantially uniform wetting of the exposed photosensitive material if the more traditional processing techniques, with their associated fluid spread patterns, are employed in large format systems. In these latter cases, the excess sheet materials and fluid not only represent increased costs in producing the film elements, but also constitute additional "garbage" which must be disposed of in one way or another.

One of the objects of this invention, therefore, is to provide an improved apparatus and method for treating photographic materials with processing fluid.

An important object of this invention is to provide an improved apparatus and method for handling photographic materials.

Another primary object of this invention is to provide a camera of the self-developing type having an improved film handling system.

An additional object of this invention is to provide a camera of the type indicated having an improved system for applying processing fluid to a sheet of photographic material.

A further object of this invention is to provide an improved process for producing a photographic print of the self-developing type.

Still an additional object of this invention is to provide inexpensive, lightweight photographic apparatus of the type indicated adapted to employ relatively inexpensive photographic materials.

Another object of this invention is to provide photographic apparatus of the type indicated which includes an improved system for applying a non-viscous processing fluid to a sheet of exposed photosensitive material.

Additionally, an object of this invention is to provide an improved camera of the type indicated which delivers a developed photographic print while retaining substantially all waste materials associated therewith.

Also, an object of this invention is to provide photographic apparatus adapted to produce photographic prints by a self-developing process and which is particularly well suited for producing prints having a large format.

A still further object of this invention is to provide an improved applicator for expressing processing fluid onto a sheet of photographic material.

Still another object of this invention is to provide an improved apparatus and method for superimposing a second photographic sheet over a first photographic sheet with the contacting surfaces thereof wetted with a processing fluid.

SUMMARY OF THE INVENTION

In its illustrated embodiment, the invention comprises a camera system having an exposure station defining platen with a carriage mounted for reversible displacement thereacross. This camera system is of the self-developing type and is adapted to employ separately coiled supply rolls of photosensitive image-recording material and image-receiving material. When initially inserted into the camera, the coiled supply of photosensitive material is mounted adjacent one end of the aforesaid exposure station, while the supply of image-receiving material is mounted on the displaceable carriage. The leaders from both of these materials are initially connected to the carriage adjacent the platen with the image-receiving material extending around a carriage mounted guide member and under a carriage mounted resiliently compressible roller. Also mounted on the carriage is an applicator containing a processing liquid.

As the carriage is displaced across the exposure station away from the supply of photosensitive material, it draws a first section of that material onto the exposure station. This section of the photosensitive material is then exposed to record a latent image thereon. During a subsequent return of the carriage across the exposure station towards the supply of photosensitive material, processing liquid is expressed from the applicator onto the exposed photosensitive material, which remains in position across the exposure station, while a first section of the image-receiving material is progressively overlayed across the wetted photosensitive material. During this last stated operation, the guide bar, in conjunction an edge control arrangement on the carriage, serves to form and retain a specially configured pool of processing liquid intermediate progressive respective sections of the photosensitive and image-receiving materials. Simultaneously, the roller on the carriage firmly presses progressive wetted sections of those materials into firm contact.

Means are included for separating the superposed sections of image-recording and image-receiving materials as they leave the exposure station and a takeup spool is provided for engaging and coiling the separated image-recording sheet therearound. At the same time, the separated image-receiving sheet is directed through a light sealed exit port of the camera. Advancement of the superposed materials from the exposure station and the simultaneous drawing of a new section of the image-recording material onto the exposure station is effected by the carriage as it is once again moved across the exposure station away from the supply of image-recording material.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 6 is an enlarged sectional view taken along line 6—6 of FIG. 4;

FIG. 7 is an enlarged sectional view taken along line 7—7 of FIG. 4;

FIG. 8 is an enlarged fragmentary partially cutaway, sectional view taken along line 8—8 of FIG. 4; and FIG. 9 is an enlarged fragmentary partially cutaway, sectional view taken along line 9—9 of FIG. 4.

DESCRIPTION OF A PREFERRED EMBODIMENT

Figure 1:
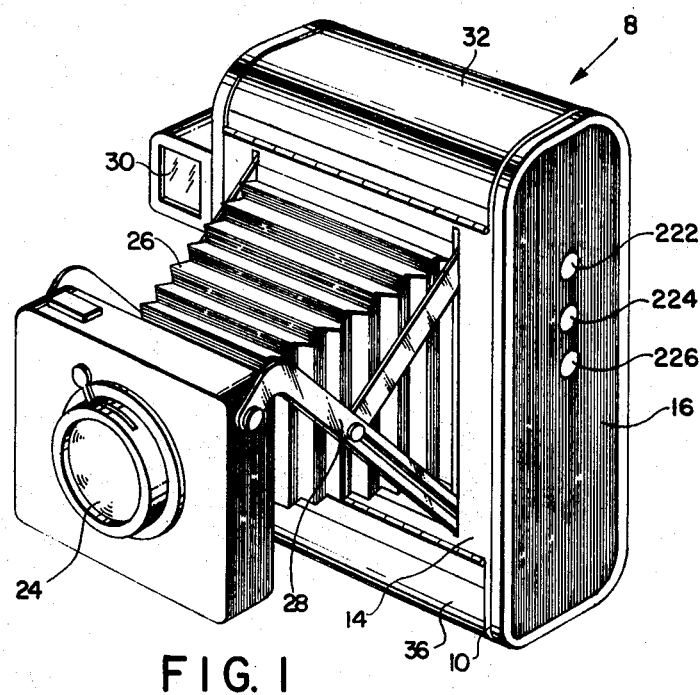
FIG. 1 is a diagrammatic perspective view of a self-developing camera embodying the features of this invention.
Figure 3:
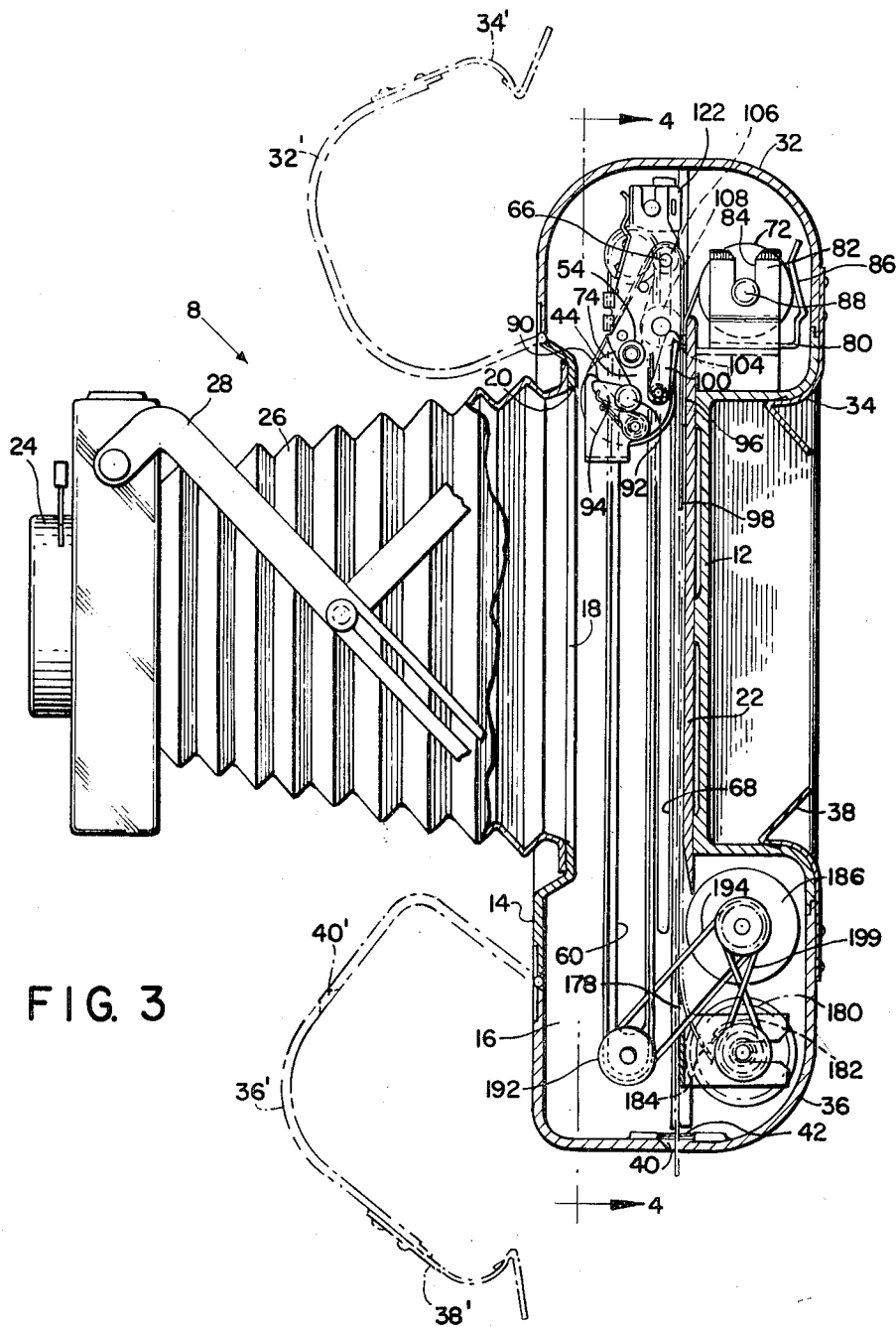
FIG. 3 is a diagrammatic, partially cutaway, partially sectioned, vertical view of the camera of FIG. 1.

The illustrated embodiment of this invention may best be understood by first referring to FIGS. 1 and 3 of the drawings, which illustrate a camera system 8 of the self-developing type incorporating the features of the present invention. As shown therein, this camera 8 comprises a housing 10 having a rear wall 12 and a forward wall 14 joined by a pair of end walls 16. The forward wall 14 includes a recessed re-entrant section 18 provided with an aperture 20 through which light can be admitted into the housing for exposing photosensitive materials positioned across an exposure station defining platen 22. Also forming part of the camera system 8 is a lens and shutter device 24 which may take a conventional form and which is mounted at the outer end of an extensible bellows 26, which bellows is provided with a suitable erecting mechanism 28. Mounted on one of the camera's end walls 16 is a rangefinder-viewfinder 30 which may also take a conventional form.

Access into the upper portion (as viewed in FIG. 3) of the camera housing 10 is provided by a cover 32 comprising a portion of the housing itself, being hinged to the forward wall 14 and provided with a spring clamp 34 adapted to releasably retain the cover in its closed position. Further, access into the lower portion of the camera housing 10 is provided by a similar hinged cover 36 provided with a spring clamp 38 adapted to releasably retain this cover in its closed position. It will be noted that this lower cover 36 is provided with an elongated exit port 40 disposed to be in alignment with the forward face of the platen 22 when the cover is in its closed position. Light sealing means 42, which may comprise a suitable felt-type material are employed in conjunction with the exit port 40 to facilitate the selective ejection of photographic materials from the camera 8 without disrupting the light-tight nature of its housing 10. This ejection process will be discussed in more detail hereinafter.

The camera 8 further includes a carriage 44 basically constituted by a pair of parallel side members 46 and 48 joined by a cross member 50 (See also FIG. 4) and which is mounted for reversible displacement across the face of the platen 22 between a position adjacent the housing's hinged cover 32 and a position adjacent its hinged cover 36. In this connection, rollers 52 and 54, positioned on the ends of pins 56 and 58 that extend from the carriage's side members 46 and 48, respectively, engage guide tracks 60 and 62 mounted from the inside faces of the camera's end walls 16. Additionally, pins 64 and 66 extend from the carriage's side members 46 and 48, respectively, into engagement with guide tracks 68 and 70 also mounted from the inside faces of the camera's end walls 16.

In the illustrated embodiment of the invention, reversible transport of the carriage 44 across the exposure station defining platen 22 is effected by a reversible drive motor 186 powered by a battery 220 and mounted within the camera housing 10 adjacent the hinged cover 36. In this connection, the motor drives a pulley 192 though a belt 194, the pulley 192 being mounted on the same shaft with a second pulley 196. This second pulley 196 is in turn connected to a pulley 198, rotatably mounted from the camera's housing 10 adjacent the cover 32, by a belt 200. A pair of pulleys 199, connected by another belt 200, are journaled from the inside face of the opposite end wall 16 of the housing 10 so as to be respectively aligned with the pulleys 196 and 198. As shown in FIG. 9, the carriage 44 is connected to the belts 200 by flanged members 202 extending respectively from the carriage's side members 46 and 48. Thus, as the motor 186 drives the pulley 192 in a counterclockwise direction as viewed in FIG. 3 of the drawings, the carriage 44 is displaced from its position adjacent the supply of photosensitive image-recording material 72 to its position adjacent the hinged cover 36. Also, when the motor 186 is subsequently caused to drive the pulley 192 in a clockwise direction as viewed in FIG. 3, the carriage 44 is returned across the platen 22 from its position adjacent the hinged cover 36 to its initial position adjacent the supply of photosensitive image-recording material 72.

Figure 2:
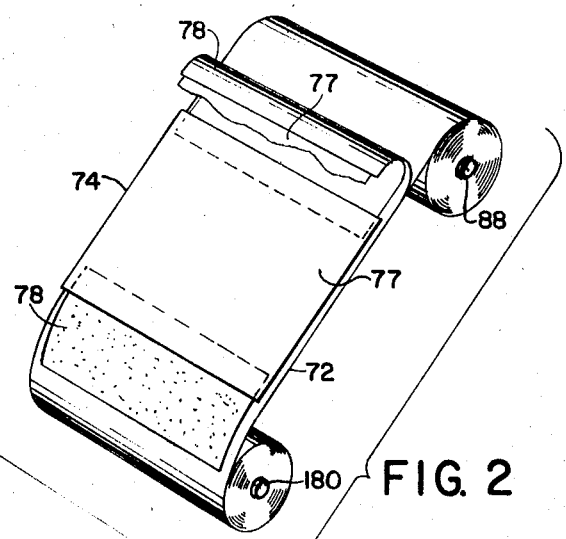
FIG. 2 is a diagrammatic perspective view, cutaway and fragmentary in nature, illustrating photographic sheet materials which may be employed in the camera of FIG. 1.

The photographic sheet materials employed in the camera 8 and which comprise a supply roll of photosensitive image-recording sheet material 72 and a supply roll of image-receiving photographic sheet material 74 are loaded into the camera 8 through the opening provided in its housing 10 when the cover 32 is displaced into its position as shown in phantom in FIG. 3. At such time, the carriage 44 is preferably disposed along the guide tracks 60 and 62 in its position as shown in that same figure. These rolls of image-recording sheet material 72 and image-receiving material 74 may, for instance, comprise sufficient such materials to facilitate the production of six finished reflective-type photographic prints, each such print being 6 × 8 inches in size. The sheet materials 72 and 74, may for example, take the forms diagrammatically depicted in FIG. 2 of the drawings. As shown therein, the roll of image-receiving photographic material 74 comprises a plurality of individual 6 × 8 inch image-receiving photographic sheets 77 joined together by narrow strips of connecting materials 78. In contrast thereto, the supply of photosensitive image-recording sheet material 72 may, if desired, comprise a continuous strip of such material. Alternately, the supply of photosensitive image-recording material 72 may comprise a plurality of discrete sheets of such material interconnected by narrow strips of non-photosensitive material, such as a suitable paper, having a relatively high absorption characteristic for the processing liquid employed to treat the photosensitive sheets.

In order to produce a reflective-type print in full color employing these materials in a diffusion-transfer process, the photosensitive image-recording element is first exposed to image carrying light rays to form a latent image thereon. Subsequently, it is treated with a suitable processing liquid and overlayed with a section of the image-recording element to form a diffusion-transfer image in terms of a dye or dyes on the latter element. The liquid is applied so as to be absorbed or imbibed into the photosensitive element, including the image-recording material thereof, and/or the image-receiving element, and the two elements are then pressed against one another and retained in this position for a predetermined period during which the formation of the dye transfer image occurs. Typical forms which these materials 72 and 74, and the processing liquid associated therewith, may take in the practice of the present invention are disclosed in U.S. Pat. Nos. 2,983,606 issued to H. G. Rogers on May 9, 1961, and 3,485,628 issued to E. H. Land on Dec. 23, 1969. The connecting materials 78, which are lapped over and adhered to the edges of the positive sensitized face of consecutive individual image-receiving sheets 77 may, for instance, be formed of a suitable absorbent paper. As will subsequently be discussed in more detail, after a section of the photosensitive image-recording material 72 has been exposed and wetted with processing liquid, an individual image-receiving sheet 77 is firmly pressed thereagainst to facilitate the formation of a visible image thereon. It is desired that the connecting materials 78 be selected so as to form stronger bonds with the wetted exposed photosensitive material 72 than the bonds formed between them and the image-recording sheets 77 when the two photographic sheets are so pressed one against the other. In this manner, when an image-receiving sheet 77 is subsequently separated from the wetted image-recording sheet 72, the connecting material 78 initially employed to join adjacent such image-receiving sheets remains attached to the strip of photosensitive image-recording material 72.

However, it should be noted that the present invention is not directed to the chemistry by which images are formed in an exposed photosensitive material and/or formed in an image-receiving stratum associated therewith. While reference has been made to U.S. Pat. Nos. 2,983,606 and 3,485,628 for purposes of illustrating typical photographic materials and processing liquids which may be employed in conjunction with the practice of the present invention, the invention itself is also applicable for use with other types of processing fluids and film structures.

Mounting means for the supply of photosensitive image-recording sheet material 72 are provided in the form of a spring clip 80 including spaced apart arms 82, each of which is provided with a slot 84, and an arm 86 positioned intermediate of the aforementioned arms 82. When mounted in the spring clip 80, the opposite ends of a rod 88, around which the sheet material 72 is coiled, are seated in the slots 84 of respective arms 82 while the arm 86 engages the peripheral surface of the coiled sheet material 72 to seat the rod in the slots 84. At such time, the arms 82 press against the ends of the coiled sheet material 72 establishing limited frictional forces therebetween which tend to oppose any rotational movement of the coiled supply of such material within the spring clip 80.

The image-recording sheet material 72 and the image-receiving sheet material 74 are provided with interconnected leaders 96 and 98, respectively, which are joined together by any suitable means such as an adhesive bond, and which are inserted under the carriage 44 along the platen 22 a sufficient distance so that spring biased latches 100, respectively mounted on the carriage's side members 46 and 48, engage apertures 104 appropriately provided through adjacent opposite edges of the leaders 96 and 98 (See also FIG. 6). After the supply of image-recording material 72 has been inserted into the spring clip 80 and the apertures 104 engaged by the latches 100, the supply of image-receiving photographic material 74 is mounted on the carriage 44. In this respect, channels 90 (also see FIG. 6) are provided in the side members 46 and 48 of the carriage 44 to receive the opposite ends of a rod 92 around which the image-receiving photographic sheet material 74 is coiled. Spring biased latches 94 respectively mounted on the carriage's side members 46 and 48 serve to releasably restrain the rod 92 in position on the carriage 44.

Figure 4:
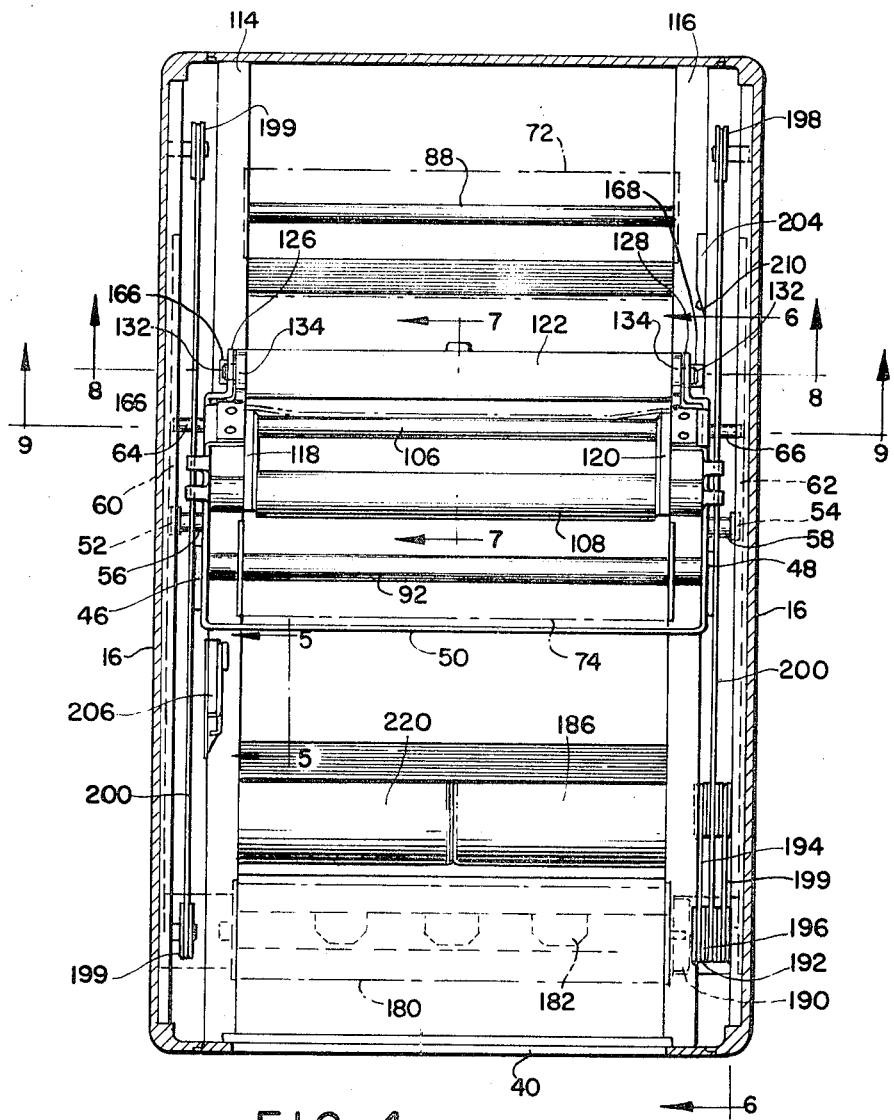
FIG. 4 is a sectional view taken along line 4—4 of FIG. 3 at such time as the displaceably mounted carriage is in its position as shown in FIG. 6 of the drawings.

Intermediate its coiled position on the carriage 44 and the platen 22, the image-receiving material 74 passes around a rigid guide bar 106 and under a roller 108. As best shown in FIG. 4, the guide bar 106 and roller 108 extend across the carriage 44 being mounted between its side members 46 and 48. Referring now to FIG. 7, it will be seen that the roller 108, which is preferably formed of a resiliently compressible material such as rubber, is mounted on the carriage 44 so that its peripheral surface 110 is disposed in close proximity to the platen 22. In this manner, the roller 108 serves to firmly press those sections of the image-recording material 72 and of image-receiving material 74 interposed between the roller and the platen 22 firmly together. Also, it will be noted that the peripheral surface 112 of the guide bar 106 is spaced apart from the platen 22 so that the section of image-receiving material 74 extending between that bar and the roller 108 defines a small acute angle with the section of image-recording material 72 adjacent thereto.

A pair of elongated rectangularly shaped plates 114 and 116 are connected to and extend in front of the platen 22 (See FIG. 4). Formed at opposite ends of the guide bar 106 so as to be positioned adjacent respective inside faces of the plates 114 and 116 are a pair of edge control members 118 and 120 which extend rearwardly from the bar 106 to a position adjacent the opposite edges of the roller 108 (See also FIG. 9). The purposes for the mounting arrangement of the guide bar 106 and the associated edge control members 118 and 120 will subsequently become more apparent.

The carriage 44 also includes means for mounting an applicator 122 (See particularly FIGS. 4, 6 and 8) which contains sufficient processing liquid to produce reflective prints from all six of the individual sheets 77 comprising the supply of image-receiving photographic material 74. In this respect, the ends 126 and 128 of the carriage's side members 46 and 48, respectively, are provided with generally "L-shaped" slots 130 adapted to releasably receive pins 132 extending from the opposite ends of the applicator 122. As best seen in FIG. 6, spring members 134 extending from the carriage's side members 46 and 48 serve both to position opposite ends of the applicator against the faces of the elongated plates 114 and 116 and to urge the applicator's pins 132 into the offset portions 136 of the "L-shaped" slots 130.

Referring now to FIGS. 7 and 8, it will be seen that the applicator 122 includes a slidably mounted elongated piston 138 which, in conjunction with the applicator's front wall 140, side walls 142 and 144 and end walls 146 and 148, define a liquid reservoir chamber 150 of variable size. An offset leaf spring 152 is positioned between the rear wall 154 of the applicator 122 and the piston 138 to continually urge the piston forwardly of the applicator towards its front wall 140. When the applicator 122 is seated against the elongated plates 114 and 116 under the force of the springs 134, its front face 156 intermediate the plates 114 and 116 is disposed in closely spaced apart relationship to the platen 22. For instance, this spacing may be on the order of the thickness of the image-recording sheet 72 plus 0.010 inches. This front face 156 of the applicator 122 includes an elongated arcuate recess 158 extending thereacross intermediate the plates 114 and 116 and adapted to communicate with the reservoir chamber 150 through a plurality of passages 160 extending through the applicator's front wall 140. However, extending across the applicator 122 so as to be seated against the rear face of the front wall 140 is a valve plate 162. This valve plate 162 is mounted for a limited amount of lateral displacement within the applicator 122 and includes a plurality of openings 164 adapted to be aligned with the passages 160 when the valve plate is in a first position and to be disposed out of alignment with the passages 160 when the valve plate is displaced into a second position. Thus it will be appreciated that the valve plate 162 may be selectively positioned, in a manner to be subsequently described, to effect either an opening of the passages 160 or a sealing thereof.

This plate 162, or at least the surface thereof in contact with the applicator's front wall 140, should be formed of a material adapted to effect a liquid-tight seal with that wall 140. For instance, if the various walls defining the applicator 122 are formed of a material such as polyethylene, the valve plate 162 may comprise a laminated structure including a polyethylene base with a polytetraflouroethylene face adapted to slidably engage the applicator's front wall 140. To facilitate selective displacement of the valve plate 162 within the applicator 122, tabs 166 and 168 extend from the opposite ends thereof exteriorly of the applicator's housing through sealed apertures appropriately provided in its end walls 146 and 148, respectively.

Mounted on the applicator's side wall 144 is a one-way valve 170 which facilitates repetitive fillings of the applicator's reservoir chamber 150 with processing liquid 172. It will be appreciated that as processing liquid 172 is injected under pressure into the applicator 122 through the one-way valve 170 with the passages 160 sealed by the valve plate 162, the piston 138 will be displaced away from the applicator's front wall 140 against the force exerted thereon by the spring 152. Whenever the valve plate 162 is subsequently displaced into its position wherein its openings 168 are aligned with the passages 160, the force of the spring 152 will effect a forward displacement of the piston 138 within the applicator causing processing liquid 172 to be expressed from the reservoir chamber 150 through the passages 160. The front face of the applicator's wall 140 is further provided with an elongated lip 174 which extends to within a very small distance, for instance, the thickness of the sheet of image-recording material 72 plus 0.005 inches, of the platen 22.

In FIGS. 6 and 7, the carriage 44 is shown traversing the platen 22 in an upward direction, i.e., in a right handed direction as viewed in those figures of the drawings. At such time, a section of the photosensitive image-recording sheet material with a latent image recorded thereon is retained in position across the exposure station. Also at such time, the valve plate 162 is disposed in its position wherein its openings 164 are aligned with the passages 160 in the applicator's front wall 140. Thus, the spring 152 effects a gradual displacement of the applicator's piston 138 toward the front wall 140, processing fluid 172 being expressed from the reservoir chamber 150 through the passages 160 into the elongated recess 158 of the applicator's front wall 140. The elongated recess 158 facilitates the lateral distribution of the processing fluid 158 across the face of the applicator. Responsive to the relative motion between the applicator 122 and the photoexposed image-recording material 72, the processing liquid 172 passes across the front face 156 of the applicator from the elongated recess 158 into contact with the elongated lip 174. This latter feature, i.e., the elongated lip 174, of the applicator 122 serves to further smooth out the stream of processing liquid between the applicator and the image-recording sheet material 72 as it meters a substantially uniform thickness of processing liquid 172 onto the sheet material. The processing liquid 172 thus applied to the sheet of image-recording material 72 is subsequently collected in a specially configured pool 176 defined by the section of image-receiving photographic sheet material 74 disposed between the guide bar 106 and the roller 108 and the adjacent section of exposed image-recording material 72.

It will be appreciated that the edge control members 118 and 120, which serve to press the edges of the image-receiving material 74 into contact with the adjacent edges of the image-recording material 72, preclude liquid 172 from escaping from the pool 176 between such adjacent edges of sheet materials. Simultaneously, the roller 108 progressively presses sections of the image-receiving material 74 into firm contact with respective sections of the image-recording material 72. In effect, this arrangement positions the pool 176 of the processing liquid 172 against the image-recording sheet material 72 and causes such pool of liquid to be progressively advanced thereacross. As liquid 172 is drawn from the pool 176, it is continually replenished by additional such liquid from the applicator 122. This unique arrangement for applying the processing liquid 172 to the exposed image-recording material 72 contributes to effecting a very uniform wetting of that material.

It will be understood that the exposed image-recording material 72 initially draws liquid 172 from the pool 176 at its natural absorption rate. During this absorption process, there is a tendency of the emulsion comprising the material 72 to swell or expand, particularly adjacent its surface, which swelling apparently reduces the rate at which the liquid 172 penetrates into the lower levels thereof. The action of the section of image-receiving material 74 intermediate the guide bar 106 and the roller 108, in conjunction with the tapered configuration of the pool 176, presses an additional quantity of the liquid 172 into the exposed image-recording material 72 immediately prior to the image-receiving sheet 74 being brought into contact therewith. Additionally as a result of the tapered configuration of the pool 176, immediately before these materials 74 and 72 are pressed together the material 74 is wetted and the layer of liquid 172 on the sheet 72 is smoothed out and thinned to a "film" thickness with the excess liquid being "wiped" away from the point of contact. Such a pool 176 may typically be on the order of 0.75 inches long with its sides converging at a small acute angle of approximately 2 degrees.

As previously indicated, when the camera is initially loaded with the supplies of photographic materials 72 and 74, the latches 100 on the carriage 44 engage the apertures 104 appropriately positioned through leaders 96 and 98 of the materials 72 and 74. Thus, during its initial downward displacement across the platen 22, the carriage 44 draws a first section of the sheet of image-recording material 72 thereonto. Simultaneously, the leaders 96 and 98 are engaged by sheet separating and guide member 178 which serves to partially separate the bonded portions thereof, to retain the leader 98 in alignment with the camera's elongated light sealed exit port 40 so that its leading edge is advanced therethrough, and to guide the partially separated leader 96 towards a takeup spool 180 that is replaceably mounted in a conventional manner for rotation within the camera housing 10 adjacent the hinged cover 36. More specifically, the sheet separating and guide member 178 is configured so that the leader 96 is directed into operative relationship with fingers 182 on the spool 180. It will be recognized that if the spool 180 is rotated in a counter-clockwise direction as the leader 96 is brought into contact therewith, the fingers 182 thereof will engage apertures 184 appropriately provided through the leader 96 adjacent its leading edge thereby tending to coil the leader around that spool. The takeup spool 180 is connected to the motor 186 through a ratchet-type uni-directional slip clutch drive mechanism 190 and a belt 199. Thus, means are provided within the camera housing 10 for engaging the leader 96 of the image-recording sheet material 72 and drawing that material onto the takeup spool 180 as it is advanced from the exposure station defining platen 22 and separated from respective sections of the image-receiving photographic material 74.

The drive mechanism 190, which may take a conventional form, precludes any rotation of the takeup spool 180 in a clockwise direction as viewed in FIGS. 3 and 6 of the drawings. Thus, when the leader 96 is engaged by the takeup spool's fingers 182, the image recording sheet material 72 will be retained in position across the platen 22 during a subsequent return of the carriage 44 to its original stated position adjacent the hinged cover 32. Additionally, since the leader 98 is still partially adhered to the leader 96 at such time, a section of the sheet of image-receiving material 74 is played out from its coiled position on the rod 92 around the guide bar 106 and under the roller 108 to position a first individual sheet 77 in superposed relationship against the section of wetted exposed image-recording sheet material 72 across the platen 22. The sheet materials 72 and 74 are preferably of the same width which represents the distance that the plates 114 and 116 are spaced apart on the platen 22. Thus, these plates 114 and 116 serve to align those materials 72 and 74 across the platen 22.

When the carriage is once again in its initial position within the camera housing 10, the latches 100 mounted thereon automatically engage the next set of apertures 104 appropriately provided through the strips of image-recording material 72 and image-receiving material 74. Therefore, during the next displacement of the carriage 44 downwardly across the platen 22, the superposed sections of image-recording material and exposed image-receiving material are advanced from the platen 22 and separated one from the other by the member 178. The separated image-recording sheet 77 constituting a finished reflective print is automatically ejected from the camera housing 10 through its light-sealed exit port 40, while the separated image-recording sheet 72, with the connecting material 78 originally employed to join the first and second individual sections 72 of image-receiving material adhered thereto, is coiled on the takeup spool 180. Simultaneously, a second section of unexposed image-recording sheet material 72 is drawn into position across the platen 22. The bonds between the first connecting material 78 and the second section 77 of image-receiving material and the photosensitive sheet 72 facilitates playout of the strip of image-receiving material 74 from the carriage 44 during its next displacement across the platen 22.

Figure 5:
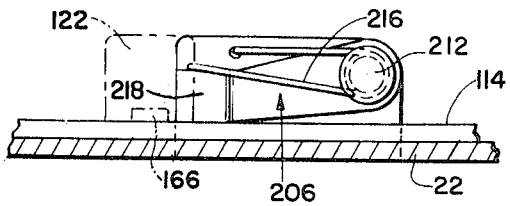
FIG. 5 is an enlarged sectional view taken along line 5—5 of FIG. 4.

To facilitate the operation of the applicator's valve plate 162, the camera 8 includes a pair of camming devices 204 and 206 (See FIG. 4), the former of which is fixedly mounted to the elongated plate 116 and includes a tapered portion 210 aligned with the valve plate's tab 168. This camming device 204 is further positioned so that its tapered portion 210 engages the tab 168 shortly before the carriage 44 reaches its upwardmost position within the camera housing 10 to effect a displacement of that plate in a left-handed direction as viewed in FIG. 8 of the drawings whereby its openings 164 are removed from alignment with the applicator's passages 160. Thus, at such time, the openings 160 are sealed and processing liquid 172 is precluded from being expressed from the applicator 122. The other camming device 206 is rotatably mounted on a pin 212 and resiliently urged into contact with the elongated plate 114 by a spring 216. Consequently, as the carriage is displaced downwardly along the platen 22 towards its position adjacent the hinged cover 36, the valve plate's tab 166 engages the camming device 206 and displaces it in a clockwise direction as viewed in FIG. 5 to facilitate the passage of that tab thereunder. When the carriage 44 subsequently begins to move upwardly within the camera's housing 10 along the guide tracks 68 and 70, the valve plate's tab 166 is engaged by a tapered portion 218 of the camming device 206 which effects a displacement of the valve plate 162 in a right-handed direction as viewed in FIG. 8 of the drawings to position its openings 164 in alignment with the applicator's passages 160. It will thus be seen that, at such time, i.e., immediately after the carriage 44 begins its upward movement within the camera housing 10, the applicator's passages 160 are unsealed and the force exerted on the processing liquid 72 within the reservoir chamber 150 by the piston 138 will cause such processing liquid to be expressed from the applicator 122 through those passages.

Summarizing, the camming device 206 effects an opening of the applicator's passages 160 as soon as the carriage 44 begins its upward movement along the guide tracks 68 and 70, while the camming device 204 effects a sealing of those passages immediately prior to the carriage's reaching its upwardmost position along such tracks.

Conventional means (not shown) are employed within the camera 8 to effect a displacement of the carriage 44 from its upwardmost position adjacent the hinged cover 32 to its lowermost position adjacent the hinged cover 36 responsive to the depression of a button 222 located on one of the camera housing's end walls 16. Simultaneously, the motor 186 drives the takeup spool 180 in a counterclockwise direction as viewed in FIG. 3. Similarly, conventional means (not shown) are incorporated with the camera 8 to effect a displacement of the carriage 44 from its lowermost position adjacent the hinged cover 36 to its upwardmost position adjacent the hinged cover 32 responsive to the depression of a button 224 located on the same end wall 16. During such latter displacement of the carriage 44 across the platen 22, rotation of the takeup spool 180 is precluded by the slip clutch mechanism 190.

Preferably, the camera 8 also includes conventional means (not shown), including a timing circuit, responsive to the depression of a button 226 whereby the carriage is first displaced upwardly across the platen 22 at a predetermined rate to effect the wetting and superpositioning of the photographic materials 72 and 74 across the platen 22, retained in its uppermost position for a predetermined period of time to facilitate the formation of a transfer image in that sheet 77 of image-receiving material superposed across the wetted exposed image-recording material and, thence, displaced downwardly across the platen at the same rate at which it traversed the platen in applying the liquid 172. For instance, in one case a quantity of 5 cc. of processing liquid 172 may be expressed from the applicator 122 onto the 6 × 8 inch format of exposed image-recording material 72 as the carriage traverses the platen at a rate of 25 inches per minute. The carriage 44 is then retained in its upwardmost position for a period of approximately 60 seconds to facilitate image transfer and finally returned to its lowermost position at a rate of 25 inches per minute. In this manner, the processing procedure is carefully controlled by and within the camera 8 itself. Each discrete area of the image-receiving material 74 thus remains in contact with its adjacent area of wetted exposed image-recording material 72 exactly the same period of time as every other discrete area thereof remains in contact with its adjacent area of image-recording material. During the downward displacement of the carriage 44 in this operational sequence, the motor 186 drives the spool 180 in a counterclockwise direction as viewed in FIG. 3.

Since the roller 108 is resiliently compressible, the support surface, i.e., the platen 22, associated therewith need not be a precision-type component of the camera system. For instance, it could be formed of aluminum in a die casting operation and employed without additional machining operations. However, it is preferably formed of, or at least its facing surface comprises, a low friction material to facilitate ready transport of the material 72 thereacross. For instance, it may comprise polytetraflouroethylene. Such a material has the additional advantage of being inert to the processing liquid. It will also be recognized, that in another arrangement the platen 22 may comprise a section of the camera's rear wall 12.

OPERATION OF THE PREFERRED EMBODIMENT

To briefly summarize the operation of the present invention, the camera 8 is preferably initially mounted on a tripod (not shown) in a vertical position as illustrated in the drawings. However, satisfactory results can be attained as long as the end of the camera's platen 22 adjacent the hinged cover 32 is not located below its other end during the processing operations. To facilitate the loading of the camera with photographic sheet materials 72 and 74 and with a liquid filled applicator 122, its hinged cover 32 is first opened to its position shown in phantom in FIG. 3 of the drawings. At such time, the carriage 44 is disposed in its upwardmost position within the camera housing 10, i.e., its position as shown in FIG. 3. A supply of photosensitive image-recording sheet material 72 coiled on a rod 88 is snapped into the spring clip 80. After the attached leaders 96 and 98 from the image-recording material 72 and the image-receiving material 74 have been inserted between the platen 22 and carriage 44, a sufficient distance for the latches 100 to engage the apertures 104 disposed therethrough, the supply of image-receiving material 74 coiled on a rod 92 is mounted on the carriage 44. In this connection, the rod 92 is inserted into the channels 90 past the spring biased latches 94. Next, an applicator 122, filled with processing liquid 172 and with its valve plate 162 in its position wherein the passages 160 are sealed, is mounted on the carriage 44.

After the hinged cover 32 has been returned to its closed position, the operator depresses the button 222 to effect an initial displacement of the carriage into its lowermost position within the camera housing 10. At such time, a first section of the photosensitive image-recording sheet material 72 is drawn across the platen 22 into position for the first exposure operation and the leader 96 is engaged by the fingers 182 of the takeup spool 180. When desired, the operator displaces the bellows 26 into its extended position, focuses the camera on the subject employing the rangefinder-viewfinder 30 and activates the lens and shutter device 24 to record a latent image of the subject on the section of photosensitive image-recording material 72 disposed across the exposure station defining platen 22.

By subsequently depressing the button 226, the carriage 44, as previously explained, is returned to its initial position adjacent the supply of image-recording sheet material 72 at a predetermined rate, retained in that position a predetermined period of time and then displaced into its position adjacent the hinged cover 36. During this operational sequence, the camming device 206 effects an unsealing of the applicator's passages 160 as the carriage 44 begins its upward movement across the platen 22 and the camming device 204 effects a resealing of those passages just before the carriage completes such upward movement. Progressive sections of the first image-recording sheet 77 are played out from the carriage 44 and firmly pressed against the wetted exposed image-recording sheet material 72 positioned across the platen 22 during the carriage's upward movement, with the pool 176 of processing liquid 172 being advanced into a final position between that piece of connecting material 78 joining the first and second sheets 77 of image-receiving material and an adjacent section of the image-recording material. This small excess of processing liquid 172 is thus absorbed into this piece of connecting material 78 to effect a relatively strong bond between it and the adjacent section of image-recording material 72. Also, at such time, the spring biased latches 100 engage the next set of apertures 104 provided through the image-recording and image-receiving materials 72 and 74. During the downward displacement of the carriage 44 in this operational sequence, the latches 100 advance the assemblage, comprising the superposed sections of image-receiving and exposed image-recording materials 74 and 72, from the platen 22 and draw a second section of the image-recording sheet material from its coiled position around the rod 88 onto the platen 22. As the first assemblage of superposed exposed image-recording material 72 and image-receiving material 74 leaves the platen 22, these materials are separated one from the other by the sheet separating and guide member 178, the finished photographic reflective print being ejected from the camera through its exit port 40 and the separated exposed image-recording sheet, with the connecting material 78 adhered thereto, being coiled around the takeup spool 180.

The image-receiving material 74 curves against the guide bar 106 in the opposite direction from which it is coiled on the rod 92. It will be recognized that this arrangement results in substantially flat finished prints being ejected from the camera 8.

The production of each subsequent finished reflective print from the remaining supplies of photographic materials 72 and 74 and processing liquid 172 is effected by first exposing the section of photosensitive image-recording material positioned across the platen 22 in the manner stated and then depressing the button 226. After the last finished reflective print has been ejected from the camera 8, the operator depresses the button 224 to return the carriage 44 to its initial position as shown in FIG. 3. At such time, the entire strip of photosensitive material 72, with the connecting materials 78 adhered thereto, has been transferred onto the takeup spool 180. The hinged door 132 is opened to facilitate the removal of the rods 88 and 92 and the applicator 122. The applicator 122 may be refilled with processing liquid 172 to facilitate its use in subsequent camera operations. The hinged door 36 is opened to facilitate the removal of the waste materials ("garbage") coiled on the takeup spool 180 and the subsequent insertion of another such spool into the camera 8 for use in connection with subsequent photographic operations.

Those familiar with the photographic arts will readily appreciate the novel and highly unique advantages of this camera system. Most importantly, the method and apparatus of this invention effect the uniform wetting of a sheet of photographic material with a processing liquid. Also importantly, a relatively inexpensive, substantially "garbage-free" system is provided for producing visible photographic images in a self-developing camera. Further, the invention comprises a processing system and method which is particularly useful in producing excellent quality large format prints, but is equally applicable for producing prints of smaller sizes.

This invention may be practiced or embodied in other ways without departing from the spirit or essential character thereof. For instance, it will be obvious that the basic film handling and processing concepts embodied therein may be carried out in a completely manually operated system. The preferred embodiment described herein is therefore illustrative and not restrictive, the scope of the invention being indicated by the appended claims and all variations which come within the meaning of the claims are intended to be embraced therein.

I claim:

1. In photographic apparatus for applying a processing fluid between a pair of sheet materials, at least one of which comprises a photosensitive sheet, the improvement comprising:
    an enclosed opaque housing;
    an exposure station within said housing;
    means for positioning such photosensitive sheet across said exposure station;
    an elongated applicator adapted to be disposed across one of such sheets of material in juxtaposed spaced apart relationship thereto from which processing fluid may be expressed onto such one sheet of material;
    means for effecting relative motion between said applicator and such one sheet of material after exposure of such photosensitive sheet within said housing whereby such processing fluid is progressively applied as a layer across such one sheet of material; and
    means for pressing progressive sections of the other of such sheets of material into firm contact with such one sheet of material behind said applicator as such relative motion is being effected between said applicator and such one sheet of material whereby such other sheet of material is superposed over such one sheet of wetted material.

2. The improvement of claim 1 wherein said pressing means comprises a roller.

3. The improvement of claim 2 wherein said roller is resiliently compressible.

4. The improvement of claim 1 wherein said motion effecting means comprises a displaceably mounted carriage on which said applicator and said pressing means are mounted.

5. The improvement of claim 1 wherein said motion effecting means comprises a displaceably mounted carriage including means for mounting such other sheet of material thereon.

6. The improvement of claim 4 additionally including means on said carriage for mounting such other sheet of material.

7. In photographic apparatus for applying a processing fluid between a pair of sheet materials, at least one of which comprises a photosensitive sheet, the improvement comprising:
    an enclosed opaque housing;
    an elongated applicator adapted to be disposed across one of such sheets of material in juxtaposed spaced apart relationship thereto from which processing fluid may be expressed onto such one sheet of material;
    means for effecting relative motion between said applicator and such one sheet of material within said housing whereby such processing fluid is progressively applied as a layer across such one sheet of material;

means for pressing progressive sections of the other of such sheets of material into firm contact with such one sheet of material behind said applicator whereby such other sheet of material is superposed over such one sheet of wetted material; and means for preventing such fluid from escaping from between the edges of such materials as such materials are pressed together.

8. The improvement of claim 7 wherein said motion effecting means comprises a carriage on which said applicator, said pressing means and said preventing means are mounted.

9. In photographic apparatus for applying a processing fluid between a pair of sheet materials, at least one of which comprises a photosensitive sheet, the improvement comprising:

an enclosed opaque housing;

an elongated applicator adapted to be disposed across one of such sheets of material in juxtaposed spaced apart relationship thereto from which processing fluid may be expressed onto such one sheet of material;

means for effecting relative motion between said applicator and such one sheet of material within said housing whereby such processing fluid is progressively applied as a layer across such one sheet of material;

means for pressing progressive sections of the other of such sheets of material into firm contact with such one sheet of material behind said applicator whereby such other sheet of material is superposed over such one sheet of wetted material; and means for subsequently separating such superposed materials within said apparatus.

10. The improvement of claim 9 wherein such other sheet of material comprises an image-receiving sheet and such one sheet of material comprises a photosensitive sheet of material additionally including means for ejecting such separated image-receiving sheet from said apparatus and for storing such separated photosensitive material within said apparatus.

11. In photographic apparatus for applying a processing liquid between a pair of sheet materials, at least one of which comprises a photosensitive sheet, the improvement comprising:

an enclosed opaque housing;

an elongated applicator adapted to be disposed across one of such sheets of material in juxtaposed spaced apart relationship thereto from which processing liquid may be expressed onto such one sheet of material;

means for effecting relative motion between said applicator and such one sheet of material within said housing whereby such processing liquid is progressively applied as a layer across such one sheet of material; and means for pressing progressive sections of the other of such sheets of material into firm contact with such one sheet of material behind said applicator and for aligning respective sections of such other sheet of material at a small acute angle to such one sheet of material immediately in advance of the point at which such materials are pressed together whereby such other sheet of material is superposed over such one sheet of wetted material and a sharply tapered pool of such liquid is formed between such materials in advance of such point.

12. The improvement of claim 11 additionally including means for preventing such fluid from escaping from between the edges of such materials adjacent such pool.

13. In photographic apparatus, the improvement comprising:

an enclosed opaque housing;

first means for positioning a strip of exposed photosensitive material across a station;

second means, mounted for reversible displacement across said station between an initial position adjacent one end thereof to a second position adjacent the opposite end thereof, for applying a processing fluid onto progressive sections of such exposed photosensitive material and pressing progressive sections of a strip of photographic image-receiving material against such strip of wetted exposed photosensitive material whereby such image-receiving material is superposed over such wetted exposed photosensitive material during the displacement of said second means from its said initial position to its said second position and for advancing such superposed materials from said station during the return of said second means to its said initial position.

14. The improvement of claim 13 additionally including means for preventing such fluid from escaping from between the edges of such image-receiving and photosensitive materials as such materials are pressed together.

15. The improvement of claim 13 additionally including means for separating such superposed materials within such apparatus as such superposed materials are advanced from said station.

16. The improvement of claim 14 additionally including means for separating such superposed materials, ejecting such separated image-receiving material from said apparatus and for storing such separated photosensitive material within said apparatus as such superposed materials are advanced from said station.

17. The improvement of claim 13 wherein said second means comprises a carriage, an applicator mounted on said carriage and a roller mounted on said carriage.

18. The improvement of claim 17 additionally including means on said carriage for mounting such image-receiving material.

19. In photographic apparatus, the improvement comprising:

an exposure station;

first means for positioning a strip of photosensitive material across said exposure station;

second means for exposing such strip of photosensitive material to image-carrying light rays to record a latent image thereon;

third means, mounted for reversible displacement across said exposure station between an initial position adjacent one end thereof to a second position adjacent the opposite end thereof, for applying a processing fluid onto progressive sections of such exposed photosensitive material and for pressing progressive sections of a strip of photographic image-receiving material against such strip of wetted exposed photosensitive material whereby such image-receiving material is superposed over such wetted exposed photosensitive material during the displacement of said third means from its said initial position to its said second position, and for advancing such superposed materials from said station during the return of said third means to its said initial position.

20. The improvement of claim 19 additionally including means for advancing another strip of photosensitive material into position across said exposure station during such return of said third means to its said initial position.

21. The improvement of claim 19 additionally including means for preventing such fluid from escaping from between the edges of such image-receiving and photosensitive materials as such materials are pressed together.

22. The improvement of claim 19 wherein at least such image-receiving material is ejected from said apparatus during such advancement thereof.

23. The improvement of claim 19 wherein said second means comprises a carriage, an applicator mounted on said carriage and a roller mounted on said carriage.

24. The improvement of claim 19 wherein said second means comprises a carriage and means on said carriage for mounting such strip of image-receiving material.

25. In photographic apparatus, the improvement comprising:

an exposure station;

first means for positioning a strip of photosensitive material across said exposure station;

second means for exposing such strip of photosensitive material to image-carrying light rays to record a latent image thereon;

third means, mounted for reversible displacement across said exposure station between an initial position adjacent one end thereof to a second position adjacent the opposite end thereof, for applying a processing fluid onto progressive sections of such exposed photosensitive material;

fourth means, mounted for displacement behind said third means in synchronization therewith as said third means moves from its said initial position to its said second position, for pressing progressive sections of a strip of photographic image-receiving material against such strip of wetted exposed photosensitive material whereby such image-receiving material is superposed over such wetted exposed photosensitive material; and fifth means for advancing such superposed materials from said station during the return of said third means to its said initial position.

26. In a system for treating a sheet of photographic material with a processing liquid, the improvement comprising an applicator adapted to express processing fluid progressively across such sheet of photographic material responsive to relative motion being effected therebetween including a reservoir chamber, a face adapted to be positioned in a predetermined spaced apart relationship to such strip of photographic material having a recess extending thereacross at least as long as the width of such photographic material to be treated with such liquid and means for connecting said reservoir chamber with said recess, and a lip extending forwardly of said face to be positioned closer to such sheet of photographic material when said applicator is disposed in operative relationship therewith, whereby when such fluid is expressed from said reservoir chamber through said connecting means said recess enhances the uniform distribution of such fluid across said face in advance of said lip and said lip further tends to effect a uniform distribution of such fluid across such sheet of photographic material as it moves therealong to meter such liquid applied along such material.

27. In a process for exposing and subsequently treating a strip of photosensitive material with a processing liquid within a photographic apparatus, the improvement comprising:

positioning a strip of photosensitive material across an exposure station;

exposing such strip of photosensitive material to image carrying light rays to record a latent image thereon;

wetting such strip of exposed photosensitive material with such processing liquid while retaining same across said exposure station;

overlaying such strip of wetted exposed photosensitive material with a strip of image-receiving photographic material while retaining such strip of exposed photosensitive material across said exposure station;

advancing the assemblage comprising such strip of wetted photosensitive material overlaid with such image-receiving material from said exposure station; and separating such image-receiving photographic material from such assemblage.

28. The improvement of claim 27 wherein said wetting and overlaying steps are at least in part performed simultaneously.

29. The improvement of claim 27 wherein the said advancing and separating steps are at least in part performed simultaneously.

30. The improvement of claim 27 wherein said separating step is performed within said apparatus and such separated image-receiving material is ejected from said apparatus and such separated photosensitive material is stored within such apparatus.

31. The improvement of claim 27 additionally including the step of simultaneously positioning another strip of photosensitive material across said exposure station as such assemblage is advanced therefrom.

32. The improvement of claim 27 wherein said overlaying step comprises the step of progressively pressing sections of such strip of image-receiving material against respective sections of such wetted exposed photosensitive material at a given rate and said separating step comprises progressively separating respective sections of such overlaid materials at substantially the same such rate.

* * * * *